No. 681,146.  
F. M. STANDLEY.  
HAY FORK.  
(Application filed May 3, 1901.)  
Patented Aug. 20, 1901.
(No Model.)
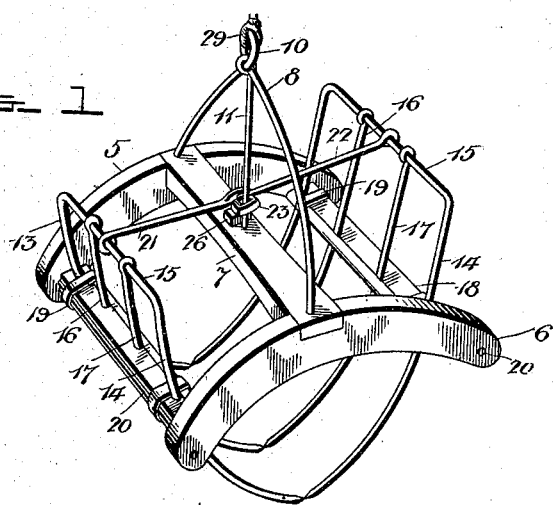
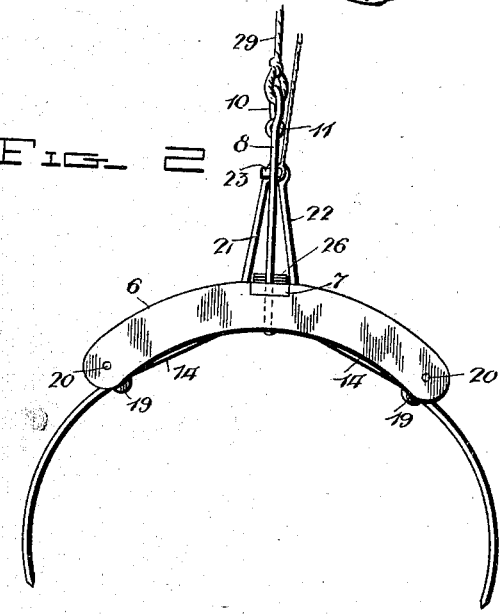
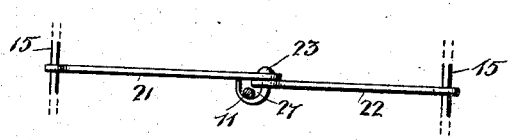
Witnesses  
Inventor  
Francis M. Standley
THE NORRIS PETERS CO., PHOTO-LITHO., WASHINGTON, D. C.

UNITED STATES PATENT OFFICE.

FRANCIS M. STANDLEY, OF LAGRANDE, OREGON.

HAY-FORK.

SPECIFICATION forming part of Letters Patent No. 681,146, dated August 20, 1901.

Application filed May 3, 1901. Serial No. 58,611. (No model.)

*To all whom it may concern:*

Be it known that I, FRANCIS M. STANDLEY, a citizen of the United States, residing at Lagrande, in the county of Union, State of Oregon, have invented certain new and useful Improvements in Hay-Forks; and I do hereby declare the following to be a full, clear, and exact description of the invention, such as will enable others skilled in the art to which it appertains to make and use the same.

This invention relates to hay-forks, and more particularly to that class used for hoisting hay, straw, or grain into mows or for raising it for any other purpose; and the object of the invention is to provide a construction which will be cheap and easy of manufacture, which will be strong and durable, and in which the tines will be held securely in their engaging positions and may be easily disengaged.

In the drawings forming a portion of this specification, and in which like numerals of reference indicate similar parts in the several views, Figure 1 is a perspective view showing the fork in its closed or engaging position. Fig. 2 is a side elevation showing the fork in open position. Fig. 3 is a top plan view showing the toggle-links, their connecting-pivot, and the manner of engaging the pivots slidably with the guide-rod.

Referring now to the drawings, the present fork comprises a frame including two arcuate plates 5 and 6, which are disposed so that they curve in parallel planes and which are connected by a transverse beam 7, having its ends engaged in recesses in the convex faces of the plates and midway of the ends of the latter. A bail 8 is provided and consists of a bar bent into U shape and having its ends engaged through the beam 7 and plates 5 and 6, the web of this bar being twisted to form an eye 10. A guide-rod 11 has an eye at one end, which is engaged through the eye of the bail and around the crossed portions of the bar forming the same, and the opposite end of the bar 11 is engaged through the crossbeam 7.

There are two sets of tines employed having the same construction, so that a description of one will suffice for them both. Each set of tines, which forms a movable fork member, consists of a bar bent into U shape to form the tines 13 and 14, which are curved and lie parallel and have a connecting web 15. Additional tines 16 and 17 are provided, which are also arcuate and each of which is bent at one end to form an eye encircling the web 15. At a point distant from the web 15 the tines are engaged in notches in a spacing-bar 18, and they are held in these notches by clips 19, which act also to hold the spacing-bar against a rod 20, which is mounted in bearings in the ends of the plates 5 and 6. As shown in Fig. 1, each fork member has a spacing-bar and the pivot-rod, so that they may be pivotally moved with the free ends of the tines toward and away from each other to close and open the fork.

In order that the fork may be held securely in closed position to prevent dropping of the load, a lock mechanism is provided and consists of two toggle-links 21 and 22, having eyes at their outer ends, which encircle the center portions of the webs 15. The inner ends of the links are also provided with eyes which engage a pivot-pin 23, one end of which is riveted against the adjacent link, while the other end is bent into an eye which embraces the guide-rod leading from the eye of the bail to the cross-beam 7. This eye portion of the pivot is formed in the flattened head of the pivot, so that there is an extended bearing-surface, which prevents binding of the eyes of the pivot on the guide-rod. When the connected ends of the links are pushed downwardly in the direction of the cross-beam 7, the outer ends thereof are forced outwardly to separate the webs 15 and move the free ends of the tines toward each other to grasp and hold the material to be raised. To hold the fork members in these engaging positions, the inner ends of the links are moved downwardly until the connecting-pivot thereof is in or slightly below the plane of the webs 15, at which time the links rest upon the block 26 on the beam 7 and are held against further downward movement.

To open the fork, a line is connected with the pivot of the links through the medium of the eye 27, formed at the opposite end of the pivot from the guide-rod, and by pulling upwardly on this line the pivot, and therewith the inner ends of the link, are moved upwardly, and after the pivot has moved above the plane of the webs 15 the forked members are unlocked and will open. The lifting or hoisting line 29 is connected with the eye of the bail.

What is claimed is—

1. A device of the class described comprising a frame including spaced plates and a connecting-beam, a bail connected with the frame, a guide-rod connected with the bail and with the cross-beam, forked members pivoted in the frame, and toggle-links pivoted to the fork members and slidably connected with the guide-rod at their inner ends.

2. A device of the class described comprising a frame including spaced plates and a connecting cross-beam, a bail connected with the frame, a guide-rod connected with the bail and the cross-beam, forked members pivoted between the plates and projecting above the cross-beam, toggle-links pivoted at their outer ends to the fork members, and a pivot-pin connecting the inner ends of the links, said pin having a flattened head bent around the guide-rod and slidably connecting the links therewith.

3. A device of the class described comprising a frame including spaced arcuate plates and a connecting cross-beam, a bail having its ends engaged through the beam and the plates and having an eye at its central portion, a guide-rod engaged through the eye of the bail and with the cross-beam, fork members each including outside tines and a connecting-web and inside tines having their ends bent around the web, spacing-bars connected to the tines and a pivot-bar connected to the spacing-bar and pivotally mounted in the arcuate plates of the frame, toggle-links pivotally connected to the webs of the fork members, and a pivot connecting the inner ends of the links and including an eye slidably engaged with the guide-rod.

In testimony whereof I hereunto sign my name, in the presence of two subscribing witnesses, on the 16th day of April, 1901.

FRANCIS M. STANDLEY.

Witnesses:
F. L. MEYERS,
W. J. CHURCH.